(12) United States Patent
Kalisz

(10) Patent No.: US 8,408,590 B2
(45) Date of Patent: Apr. 2, 2013

(54) ACTIVE BOLSTER WITH INTERNAL TEAR JOINTS

(75) Inventor: Raymond E. Kalisz, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 13/075,294

(22) Filed: Mar. 30, 2011

(65) Prior Publication Data

US 2012/0248741 A1 Oct. 4, 2012

(51) Int. Cl.
*B60R 21/045* (2006.01)
(52) U.S. Cl. ............ 280/730.1; 280/752; 280/280; 280/753
(58) Field of Classification Search ............ 280/751, 280/752, 753, 730.1; 224/280, 281, 282
See application file for complete search history.

(56) References Cited

U.S. PATENT DOCUMENTS

| | | | |
|---|---|---|---|
| 6,032,978 A | 3/2000 | Spencer et al. | |
| 6,203,057 B1 | 3/2001 | Spencer et al. | |
| 6,213,497 B1 | 4/2001 | Spencer et al. | |
| 6,758,493 B2 | 7/2004 | Conlee et al. | |
| 8,328,230 B1 * | 12/2012 | Kalisz | 280/730.1 |
| 2008/0164681 A1 | 7/2008 | Nuthalapati | |
| 2009/0152848 A1 | 6/2009 | Sadr et al. | |
| 2009/0152849 A1 | 6/2009 | Saraf et al. | |
| 2009/0284041 A1 | 11/2009 | Hall et al. | |
| 2010/0207370 A1 | 8/2010 | Haba et al. | |
| 2010/0326782 A1 | 12/2010 | VandenBerge et al. | |
| 2011/0115201 A1 | 5/2011 | Best et al. | |

FOREIGN PATENT DOCUMENTS

WO WO2007011787 A1 10/2007

OTHER PUBLICATIONS

Raj S. Roychoudhury et al., Blow-Molded Plastic Active Knee Bolsters, SAE Technical Paper Series 2004-01-0844, Mar. 8-11, 2004, pp. 1-9.
Bijoy K. Saraf, et al., Active Bolster for Side Impact Protection, SAE Technical Paper Series 2008-01-0191, Apr. 14-17, 2008, pp. 1-11.

* cited by examiner

*Primary Examiner* — Eric Culbreth
(74) *Attorney, Agent, or Firm* — Vichit Chea; MacMillan, Sobanski & Todd, LLC

(57) ABSTRACT

An active bolster for passenger crash protection in a vehicle comprises a base wall and a front wall, the walls having first and second facing surfaces to form an inflatable bladder with an initial open space between the surfaces. The bladder includes a plurality of tear joints. Each tear joint is comprised of first and second upstanding ribs wherein the first upstanding rib extends from the first surface part way into the open space and extends end-to-end along a first direction. The second upstanding rib extends from the second surface part way into the open space to contact the first upstanding rib and extends end-to-end substantially along a second direction that is substantially transverse to the first direction so that the first and second upstanding ribs contact at an intersection. At each intersection the first and second upstanding ribs comprise a welded joint that is substantially rigid against compression forces and that allows the tear joints to separate under tension during inflation of the bladder.

11 Claims, 3 Drawing Sheets

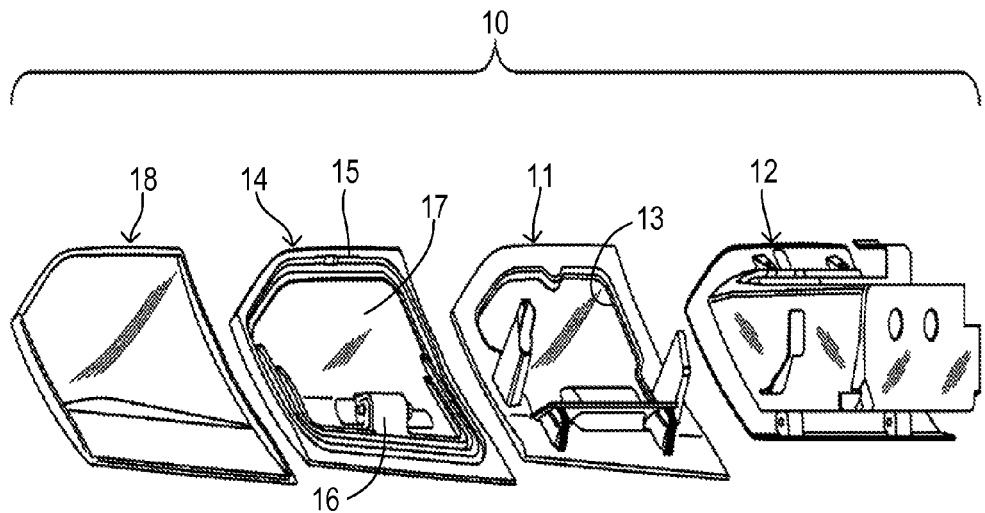
Fig. 1 (Prior Art)
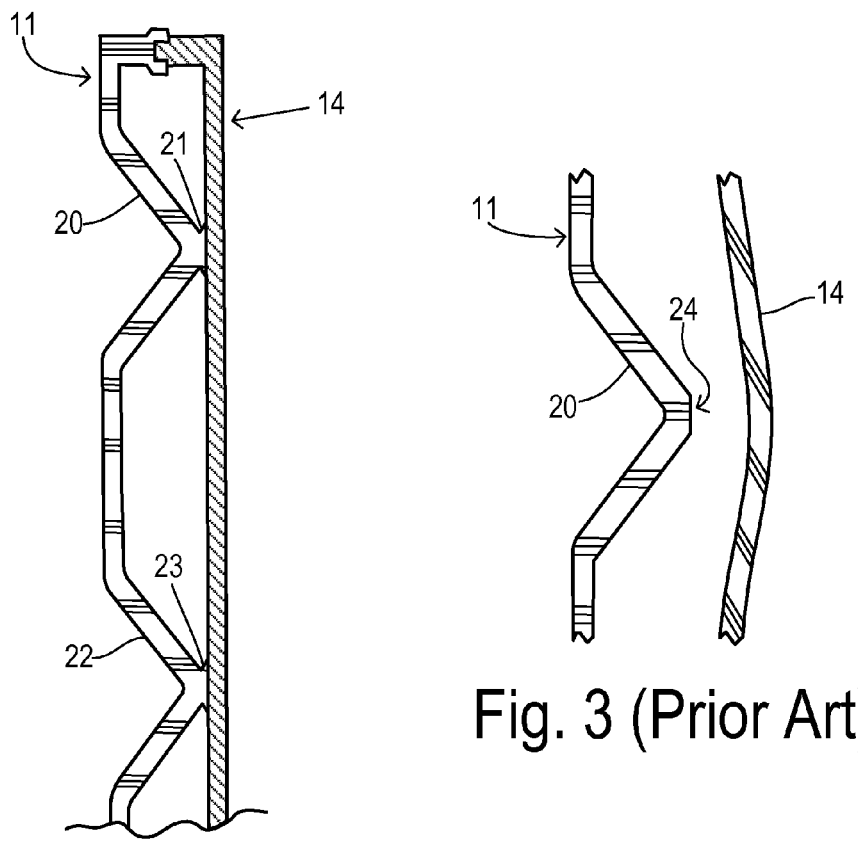
Fig. 2 (Prior Art)
Fig. 3 (Prior Art)

ACTIVE BOLSTER WITH INTERNAL TEAR JOINTS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to prevention of the oil-canning effect at the interior trim surface of an inflatable bladder for an active bolster.

An active bolster is a vehicle occupant protection device with a gas-inflatable bladder to absorb impacts and reduce trauma to occupants during a crash. As opposed to deploying air bag cushions through various openings, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive.

In a typical structure, an active bolster includes a front wall or panel that faces a vehicle occupant and that is attached to a base wall or panel along a sealed periphery. One or both of the walls is deformable in order to provide an inflatable bladder. The walls are initially spaced apart while in their non-inflated condition. This allows ingress of the inflation gas in a manner that achieves even inflation across the panel.

As a result of having spaced apart walls, the oil-canning effect can become a problem. Oil canning is the springing in and out of a flat panel perpendicular to the plane of the panel. In addition to a drum-like noise, oil canning is undesirable because it gives a perception of lack of structural quality and integrity. Furthermore, vibrations during operation of a vehicle may become concentrated at the bolster, thereby creating additional noise.

As disclosed in U.S. Pat. No. 8,205,909, the inner field of the bladder walls may contain a plurality of interconnections to improve rigidity and avoid oil canning. Since the front wall moves away from the back or base wall during inflation, the interconnections between the walls must tear or separate during inflation. Thus, the interconnection between the walls must be strong enough to avoid oil canning while being weak enough to avoid interfering with inflation.

The front and base walls of a typical active bolster are comprised of molded thermoplastics such as polyethylene, polyolefin, or PVC. They can be blow molded or injection molded. U.S. Pat. No. 8,205,909 discloses pyramidal or conic shaped interconnections projecting from the base wall to contact the front wall. The resulting single point connections make it difficult to control the joint strength and depth during welding of the walls together. It would be desirable to have better control over the strength of the welded joint. In addition, the welding in close proximity to the front wall may cause visible marks on the passenger-facing side of the front wall. It would be desirable to insure a smooth uninterrupted surface of the passenger-facing Class A side.

SUMMARY OF THE INVENTION

In one aspect of the invention, an active bolster comprises a base wall for mounting against a rigid structure of the vehicle and a front wall overlying the base wall and forming an interior trim piece of the vehicle. The base wall has a first surface facing the front wall, and the front wall has a second surface facing the base wall. The base wall and front wall are comprised of molded plastic components joined around a periphery to form an inflatable bladder with an initial open space between the first and second surfaces. The bladder includes a plurality of tear joints. Each tear joint is comprised of first and second upstanding ribs wherein the first upstanding rib is integrally formed with the base wall, extends from the first surface part way into the initial open space toward the second surface, and extends end-to-end substantially along a first direction. The second upstanding rib is integrally formed with the front wall, extends from the second surface part way into the initial open space to contact the first upstanding rib, and extends end-to-end substantially along a second direction that is substantially transverse to the first direction so that the first and second upstanding ribs contact at an intersection. At each intersection the first and second upstanding ribs comprise a welded joint that is substantially rigid against compression is forces and that allows the tear joints to separate under tension during inflation of the bladder.

BRIEF DESCRIPTION OF THE DRAWINGS

FIG. 1 is an outward-looking, exploded perspective view of an active knee bolster glove box door system of a type to which the present invention can be applied.

FIG. 2 is a side cross section through the front and base walls according to a prior art construction.

FIG. 3 shows a portion of the walls of FIG. 2 after inflation of the walls.

DETAILED DESCRIPTION OF PREFERRED EMBODIMENTS

Figure 4:
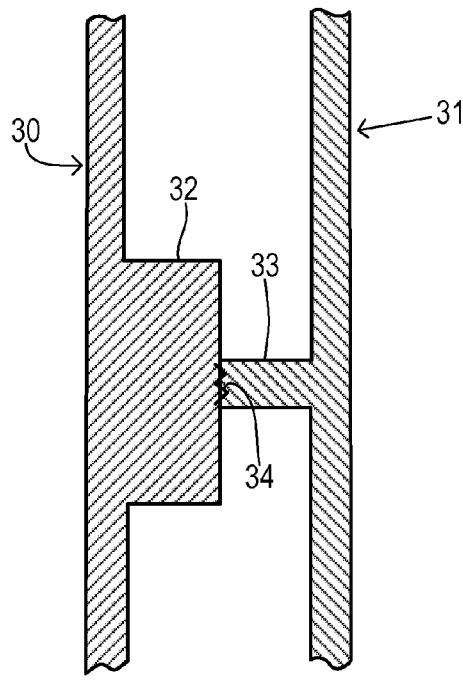
FIG. 4 is a side cross section through the front and base walls according to one embodiment of the present invention.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support below a steering column, for example. Such locations are accessible to the knees of an individual riding in a corresponding seating position within a vehicle.

Base 11 has a periphery 13 adapted to be sealed to a front wall 14 having a matching periphery 15. Base 11 and front wall 14 are preferably comprised of molded plastics and may be joined by plastic welding, such as hot plate welding, to form a peripheral seal around an interior open space 17 for forming a bladder. An inflation gas source 16 is electronically controlled for activating during a crash to release gas to inflate the bolster. Front wall 14 may comprise the interior trim surface (e.g., the outside of the glove box door), or an additional skin 18 can be applied to the outer surface (i.e., Class A surface) of front wall 14. Skin 18 is preferably constructed of plastic and may be a vacuum formed thermoplastic bilaminate that may be grained or otherwise finished.

In the prior art, the front and base panels have been molded using blow molding and/or injection molding. FIG. 2 shows a blow molded base wall 11 having conical projections 20 and 22 extending from the backing plane of base wall 11 toward front wall 14 at spaced locations. Heat welds 21 and 23 are formed to reduce oil canning of front wall 14. As shown in FIG. 3, during inflation front wall 14 moves away from base wall 11 and the heat weld separates at a tear joint 24. Due to the blunt, pointed shape of cones 20 and 22, the size and strength of welds 21 and 23 may be difficult to control. Moreover, regions of front wall 14 between the attachment points remain as smooth bendable planes without reinforcement so that smaller regions of oil canning may still occur.

Figure 5:
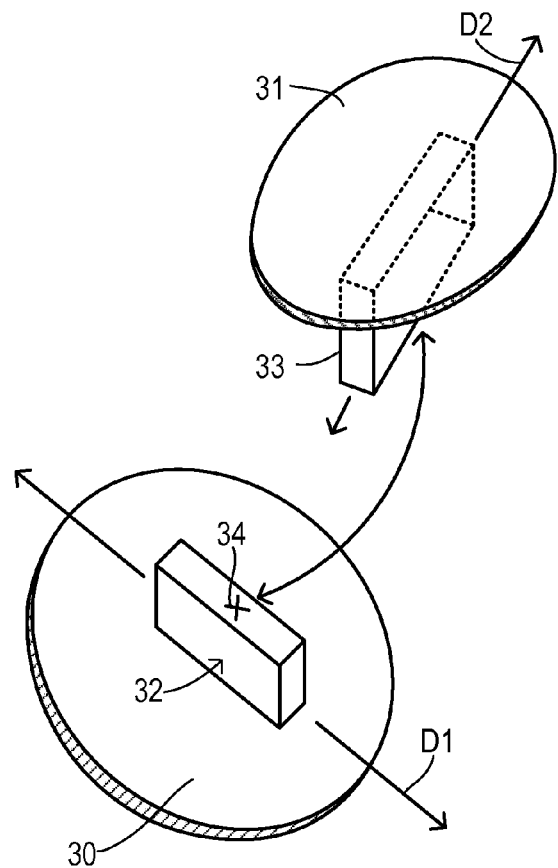
FIG. 5 is a partial, perspective view showing ribs on the front and base walls for preventing the oil-canning effect.

FIGS. 4 and 5 illustrate an improved interconnection between the bladder walls that provides better control of weld strength and improved reduction of oil canning. A base wall 30 is joined to a front wall 31. Base wall 30 has an upstanding rib 32 and front wall 31 has an upstanding rib 33. Upstanding ribs 32 and 33 extend in substantially transverse (i.e., perpendicular) directions in the manner of a cross. Each upstanding rib 32 and 33 is integrally formed with wall 30 and 31, respectively. Rib 32 extends from the surface of base wall 30 part way into the initial open space toward the surface of front wall 31. Upstanding rib 33 extends from the surface of front wall 31 part way into the initial open space to contact upstanding rib 32 at an intersection where they cross.

Figure 6:
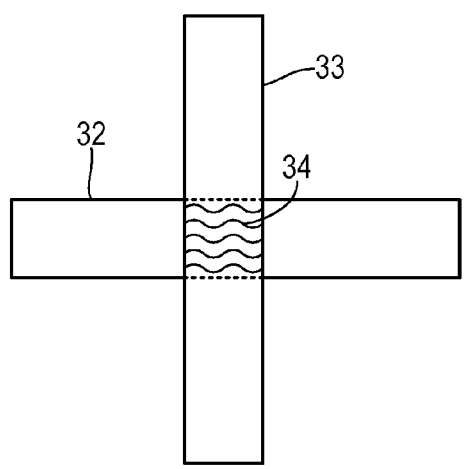
FIG. 6 is a plan view showing the intersection of the ribs.

A weld 34 is formed at the intersection of ribs 32 and 33. Additional pairs of upstanding ribs are deployed across the interior region of the bladder between base wall 30 and front wall 31. As shown in FIG. 5, upstanding rib 32 has a lengthwise (end-to-end) orientation in a direction $D_1$ while upstanding rib 32 extends in a direction $D_2$, wherein $D_1$ and $D_2$ are at substantially right angles. Thus, the area of weld 34 is well controlled since it is determined by the easily-controlled widths of ribs 32 and 33. FIG. 6 illustrates how the widths determine the area of the intersection and, thus, the size of the weld. The end-to-end direction of the ribs, as shown in FIG. 5, should be close to perpendicular in order to assure precise control of the welds and easy registration of the ribs for welding. However, other directions may be used and the ribs could follow a curved path rather than being completely straight. Even so, the end-to-end directions of the ribs would still be substantially transverse. In order to provide the desired strength, the welded joint at each intersection may have an area of about 1 square millimeter.

An additional benefit of the upstanding ribs is to break up the flexion of the front wall since it no longer is entirely planar like a drum head. All the upstanding ribs on the front wall may be aligned in parallel. Alternatively, some ribs may be provided at other directions to further reduce the tendency of the front wall to behave like a drum head (provided that the ribs in each pair continue to be substantially transverse). Yet another benefit is that the crossing ribs can be easily fit into many positions within the bladder, especially as compared to the conical shapes discussed above.

Figure 7:
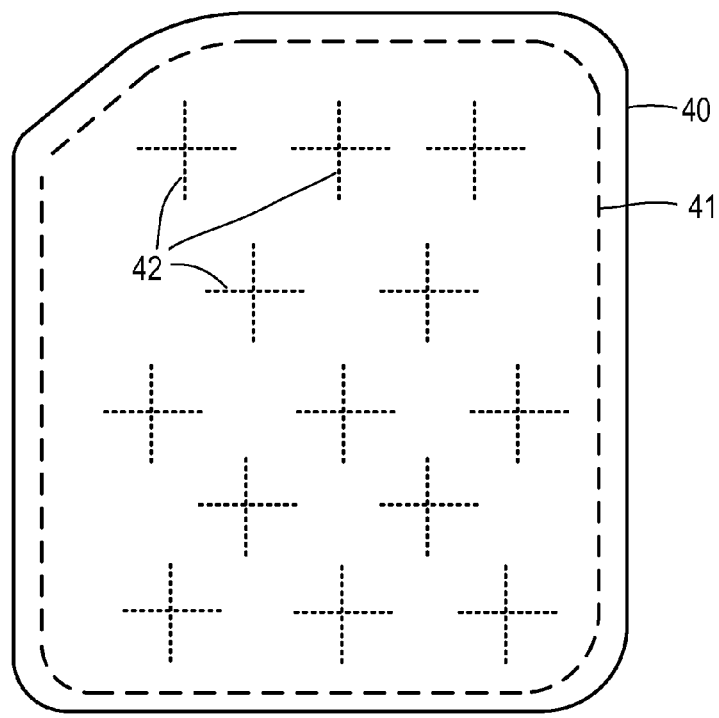
FIG. 7 is a plan view showing in phantom a layout pattern for internal tear joints.
Figure 8:
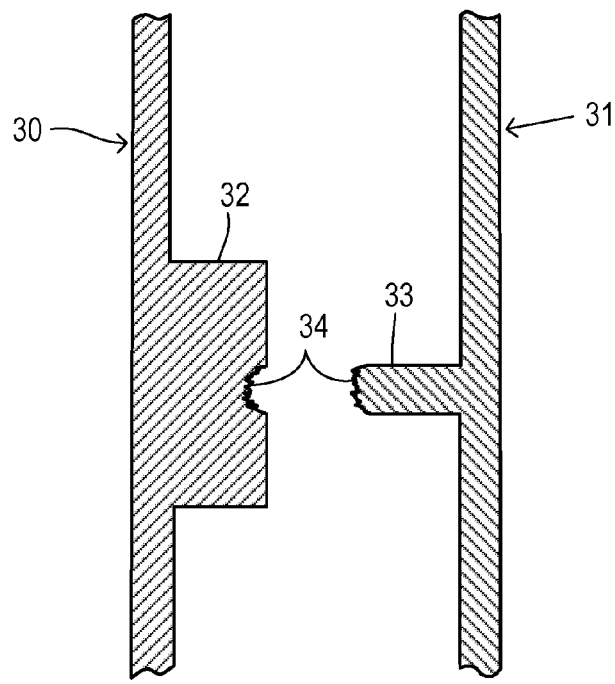
FIG. 8 is a side cross section of a tear joint of the invention after inflation of the walls.

FIG. 7 illustrates a bolster 40 with front and base walls joined around a welded periphery 41. A plurality of tear joints 42 are each comprised of pairs of upstanding ribs. Preferably, some pairs may have an upstanding rim on the front wall that extends horizontally in the figure while others extend vertically. Spacing of the tear joints and the size of each respective weld area for each rib pair are easily controlled by design in a manner that achieves a desired retention force that substantially prevents flexing of the front wall under compression forces while allowing the tear joints to separate under tension during inflation of the bladder. FIG. 8 shows a respective pair of ribs 32 and 33 after tearing of the weld 34.

What is claimed is:

1. An active bolster for an automotive vehicle, comprising:
   a base wall for mounting against a rigid structure of the vehicle; and
   a front wall overlying the base wall and forming an interior trim piece of the vehicle;
   wherein the base wall has a first surface facing the front wall, and the front wall has a second surface facing the base wall;
   wherein the base wall and front wall are comprised of molded plastic components, and the base wall and front wall are joined around a periphery to form an inflatable bladder with an initial open space between the first and second surfaces, wherein the bladder includes a plurality of tear joints;
   wherein each tear joint is comprised of first and second upstanding ribs, wherein the first upstanding rib is integrally formed with the base wall, extends from the first surface part way into the initial open space toward the second surface, and extends end-to-end substantially along a first direction, and wherein the second upstanding rib is integrally formed with the front wall, extends from the second surface part way into the initial open space to contact the first upstanding rib, and extends end-to-end substantially along a second direction that is substantially transverse to the first direction so that the first and second upstanding ribs contact at an intersection; and
   wherein at each intersection the first and second upstanding ribs comprise a welded joint that is substantially rigid against compression forces and that allows the tear joints to separate under tension during inflation of the bladder.

2. The active bolster of claim 1 wherein the tear joints are disposed sufficiently closely in a pattern to inhibit oil-canning across the interior trim piece.

3. The active bolster of claim 1 wherein the front wall comprises a Class A surface on its side opposite the second surface.

4. The active bolster of claim 1 further comprising an outer skin attached to the front wall for providing a Class A surface.

5. The active bolster of claim 1 wherein the base wall and front wall comprise a door of a storage compartment.

6. The active bolster of claim 1 wherein the first upstanding ribs all have their first directions oriented parallel to one another, and wherein the second upstanding ribs all have their second directions oriented parallel to one another.

7. The active bolster of claim 1 wherein the welded joint at each intersection has an area of about 1 square millimeter.

8. The active bolster of claim 1 wherein the base wall and front wall are formed by injection molding.

9. The active bolster of claim 1 wherein the base wall and front wall are joined around a periphery by a weld.

10. A method of preventing oil-canning in an active bolster for an automotive vehicle, comprising the steps of:
    injection molding a base wall for mounting against a rigid structure of the vehicle;
    injection molding a front wall overlying the base wall and forming an interior trim piece of the vehicle, wherein the base wall has a first surface facing the front wall, and the front wall has a second surface facing the base wall;
    joining the base wall and front wall around a periphery to form an inflatable bladder with an initial open space between the first and second surfaces, wherein the bladder includes a plurality of tear joints, wherein each tear joint is comprised of first and second upstanding ribs, wherein the first upstanding rib is integrally formed with the base wall, extends from the first surface part way into the initial open space toward the second surface, and extends end-to-end substantially along a first direction, and wherein the second upstanding rib is integrally formed with the front wall, extends from the second surface part way into the initial open space to contact the first upstanding rib, and extends end-to-end substantially along a second direction that is substantially transverse to the first direction so that the first and second upstanding ribs contact at an intersection; and forming a welded joint at each intersection of the first and second upstanding ribs that is substantially rigid against compression forces and that allows the tear joints to separate under tension during inflation of the bladder.

11. An active bolster comprising:

a base wall;

a front wall;

the walls forming a plurality of internal joints each comprising a respective pair of first and second upstanding ribs in a space between the walls, the first ribs aligned in a first direction and the second ribs aligned in a substantially transverse direction, the first and second ribs contacting at respective intersections, each intersection comprising a welded joint that separates under tension during bolster inflation.

* * * * *